US012435661B1

(12) United States Patent
Simard-Bergeron et al.

(10) Patent No.: US 12,435,661 B1
(45) Date of Patent: *Oct. 7, 2025

(54) ROTARY ENGINE WITH SEAL HAVING SHIELD AND ELASTOMERIC MEMBER

(71) Applicant: PRATT & WHITNEY CANADA CORP., Longueuil (CA)

(72) Inventors: Julien Simard-Bergeron, Montréal (CA); David Gagnon-Martin, Longueuil (CA); Jean-Gabriel Gauvreau, Varennes (CA); Stephane Berube, St-Philippe (CA); Sébastien Bolduc, St-Bruno-de-Montarville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/629,115

(22) Filed: Apr. 8, 2024

(51) Int. Cl.
*F02B 55/08* (2006.01)
*F02B 53/00* (2006.01)
*F16J 15/02* (2006.01)

(52) U.S. Cl.
CPC ............ *F02B 55/08* (2013.01); *F16J 15/021* (2013.01); *F02B 2053/005* (2013.01)

(58) Field of Classification Search
CPC .................. F01C 19/005; F01C 21/108; F02B 2053/005; F02B 55/08; F02B 55/00
See application file for complete search history.

(56) References Cited

U.S. PATENT DOCUMENTS 3,309,011 A * 3/1967 Osakada ................ F01C 19/10 418/142
3,695,790 A * 10/1972 Jones .................... F16J 15/127 418/83

(Continued)

FOREIGN PATENT DOCUMENTS

DE 102008026920 A1 6/2009
DE 102010034979 A1 2/2012

(Continued)

OTHER PUBLICATIONS

Translation DE-102014017849-A1 (Year: 2025).*
European Search Report issued in corresponding EP application No. 19219031.2 on May 6, 2020.

*Primary Examiner* — J. Todd Newton
(74) *Attorney, Agent, or Firm* — NORTON ROSE FULBRIGHT CANADA LLP

(57) ABSTRACT

A housing assembly has: a rotor housing extending around a rotation axis and from a first side to a second side, and having an inner face; a housing secured to the first side; and a seal received within a groove at an interface between the rotor housing and the housing, the groove extending around a perimeter of the first side and located radially outwardly of the inner face, the seal including: an elastomeric member; and a shield disposed inwardly of the elastomeric member and in contact with both the housing and the rotor housing, the shield including a thermoset plastic member extending along at least a portion of a perimeter of the groove and axially overlapping the elastomeric member, the thermoset (Continued)

plastic member circumferentially overlapping a combustion region of the rotor cavity where combustion occurs during operation of the rotary internal combustion engine.

17 Claims, 6 Drawing Sheets

(56) References Cited

U.S. PATENT DOCUMENTS 3,782,869 A * 1/1974 Steinwart ................ F01C 19/10 418/142
3,833,320 A 9/1974 Telang et al.
3,844,694 A * 10/1974 Lamm ..................... F02B 53/00 418/149
3,847,518 A * 11/1974 Prasse ................... F01C 19/005 418/152
3,914,499 A * 10/1975 Siefert ....................... C08J 5/08 428/394
3,930,767 A * 1/1976 Hart ........................ F01C 19/10 418/113
3,964,843 A * 6/1976 Terazawa .............. F01C 21/104 418/83
3,970,527 A 7/1976 Brown
3,975,122 A * 8/1976 Hackbarth .............. F01C 19/12 418/83
3,980,412 A * 9/1976 Terazawa ................ F01C 19/08 418/149
4,018,548 A * 4/1977 Berkowitz ............ F04C 27/002 418/129
4,097,207 A * 6/1978 Kakui ..................... F01C 21/06 418/179
4,137,024 A * 1/1979 Jones ...................... F01C 21/08 418/116
4,259,932 A 4/1981 Hideg et al.
4,782,656 A 11/1988 Hansen
5,499,826 A * 3/1996 Pippert .................. F16J 15/166 87/7
6,439,868 B1 * 8/2002 Tomoiu ................. F01C 1/3443 418/221
8,985,588 B2 * 3/2015 Feistel .................. F04B 53/143 277/491
9,435,340 B2 9/2016 Doepker et al.
11,274,748 B2 * 3/2022 Andueza .............. F16J 15/3496
12,104,550 B1 * 10/2024 Bousquet ............... F02F 11/005
12,110,796 B1 * 10/2024 Vinski ................... F01C 1/3442
12,123,370 B2 * 10/2024 Simoneau ............... F04C 29/04
2001/0055652 A1 * 12/2001 Dalzell, Jr. ........... F01D 11/122 427/447
2011/0126795 A1 6/2011 Hua
2013/0313780 A1 * 11/2013 Johnson .............. E21B 33/1208 277/300
2014/0023541 A1 * 1/2014 Heidecker .......... B29D 99/0085 277/387
2015/0167546 A1 6/2015 Villeneuve et al.
2017/0009582 A1 * 1/2017 Chana ..................... F01C 21/08
2018/0163541 A1 6/2018 Villeneuve et al.
2020/0200009 A1 * 6/2020 Gagnon-Martin ...... F01C 21/06
2024/0301839 A1 * 9/2024 Simoneau ............... F04C 29/04
2024/0318611 A1 * 9/2024 Bousquet ............... F16J 15/104
2025/0020061 A1 * 1/2025 Vinski ..................... F02B 55/10

FOREIGN PATENT DOCUMENTS

DE 102014017849 A1 * 6/2016 ................ F01C 1/22
DE 102016012262 A1 4/2018
GB 2432630 A 5/2007

* cited by examiner

ROTARY ENGINE WITH SEAL HAVING SHIELD AND ELASTOMERIC MEMBER

TECHNICAL FIELD

The application relates generally to internal combustion engines and, more particularly, to rotary internal combustion engines.

BACKGROUND

The combustion chambers of a rotary engine, such as a Wankel engine, are delimited radially by the rotor and rotor housing and axially by a side housing. The side housing faces the combustion chambers and is thus subjected to high pressure and thermal loads. On the other hand, the side housing provides the running surface for the rotor's side seals.

SUMMARY

In one aspect, there is provided a housing assembly for a rotary internal combustion engine, comprising: a rotor housing defining a rotor cavity extending around a rotation axis, the rotor housing extending from a first side to a second side, the rotor housing having an inner face facing the rotor cavity; a housing secured to the first side of the rotor housing and thereby enclosing the rotor cavity; and a seal received within a groove defined by one or both of the rotor housing and the housing at an interface between the rotor housing and the housing, the groove extending around a perimeter of the first side of the rotor housing, the groove being located radially outwardly of the inner face of the rotor housing, the seal including: an elastomeric member; and a shield disposed radially inwardly of the elastomeric member relative to the rotation axis and in contact with both the housing and the rotor housing, the shield including a thermoset plastic member extending along at least a portion of a perimeter of the groove and axially overlapping the elastomeric member, the thermoset plastic member circumferentially overlapping a combustion region of the rotor cavity where combustion occurs during operation of the rotary internal combustion engine.

The housing assembly described above may include any of the following features, in any combinations.

In some embodiments, the thermoset plastic member is made of polybenzimidazole.

In some embodiments, the thermoset plastic member extends an entirety of the perimeter of the groove.

In some embodiments, the shield is circumferentially segmented and includes a first circumferential segment including the thermoset plastic member and a second circumferential segment made of polyether ether ketone, the second circumferential segment extending along a remainder of the perimeter of the groove.

In some embodiments, the shield is circumferentially segmented and includes a first circumferential segment including the thermoset plastic member and a second circumferential segment made of a metallic seal, the second circumferential segment extending along a remainder of the perimeter of the groove.

In some embodiments, the groove includes an inner groove and an outer groove separated from one another by an annular wall, the elastomeric member received in the outer groove, the shield received in the inner groove.

In some embodiments, the housing includes a side wall secured to the rotor housing and a side plate, a peripheral section of the side plate disposed between the side wall and the rotor housing.

In some embodiments, a gap is defined between the rotor housing and the peripheral section of the side plate, the groove communicating with the rotor cavity through the gap.

In some embodiments, a coolant circuit extends within the rotor housing and the housing, the seal fluidly separating the coolant circuit from the rotor cavity.

In another aspect, there is provided a rotary internal combustion engine comprising: a rotor; a rotor housing defining a rotor cavity extending around a rotation axis, the rotor housing extending from a first side to a second side, the rotor housing having an inner face facing the rotor cavity; a housing secured to the first side of the rotor housing and thereby enclosing the rotor cavity; and a seal received within a groove defined by one or both of the rotor housing and the housing at an interface between the rotor housing and the housing, the groove extending around a perimeter of the first side of the rotor housing, the groove being located radially outwardly of the inner face of the rotor housing, the seal including: an elastomeric member; and a shield disposed radially inwardly of the elastomeric member relative to the rotation axis and in contact with both of the housing and the rotor housing, the shield including a circumferential segment made of a thermoset plastic member axially overlapping the elastomeric member, the circumferential segment circumferentially overlapping a region of the rotor cavity where combustion occurs during operation of the rotary internal combustion engine.

The rotary engine described above may include any of the following features, in any combinations.

In some embodiments, the thermoset plastic member is made of polybenzimidazole.

In some embodiments, the housing defines a pilot a pilot subchamber, the circumferential segment circumferentially overlapping the pilot subchamber.

In some embodiments, the shield is circumferentially segmented and includes the circumferential segment including the thermoset plastic member and a second circumferential segment made of polyether ether ketone, the second circumferential segment extending along a remainder of a circumference of the groove.

In some embodiments, the shield is circumferentially segmented and includes the circumferential segment including the thermoset plastic member and a second circumferential segment made of a metallic seal, the second circumferential segment extending along a remainder of a circumference of the groove.

In some embodiments, the groove includes an inner groove and an outer groove separated from one another by an annular wall, the elastomeric member received in the outer groove, the shield received in the inner groove.

In some embodiments, the housing includes a side wall secured to the rotor housing and a side plate, a peripheral section of the side plate disposed between the side wall and the rotor housing.

In some embodiments, a gap is defined between the rotor housing and the peripheral section of the side plate, the groove communicating with the rotor cavity through the gap.

In some embodiments, a coolant extends circuit within the rotor housing and the housing, the seal fluidly separating the coolant circuit from the rotor cavity.

In yet another aspect, there is provided a method of sealing a rotary internal combustion engine having a rotor cavity bounded by a rotor housing and a housing, the method comprising: mitigating leakage of combustion gases out of the rotor cavity with an elastomeric member at an interface between the rotor housing and the housing; and protecting the elastomeric member from the combustion gases with a thermoset plastic member disposed between the elastomeric member and the rotor cavity and in register with a combustion region of the rotor cavity.

In some embodiments, the protecting of the elastomeric member from the combustion gases with the thermoset plastic member includes protecting the elastomeric member with the thermoset plastic member made of polybenzimidazole.

BRIEF DESCRIPTION OF THE DRAWINGS

Reference is now made to the accompanying figures in which.

DETAILED DESCRIPTION

Figure 1:
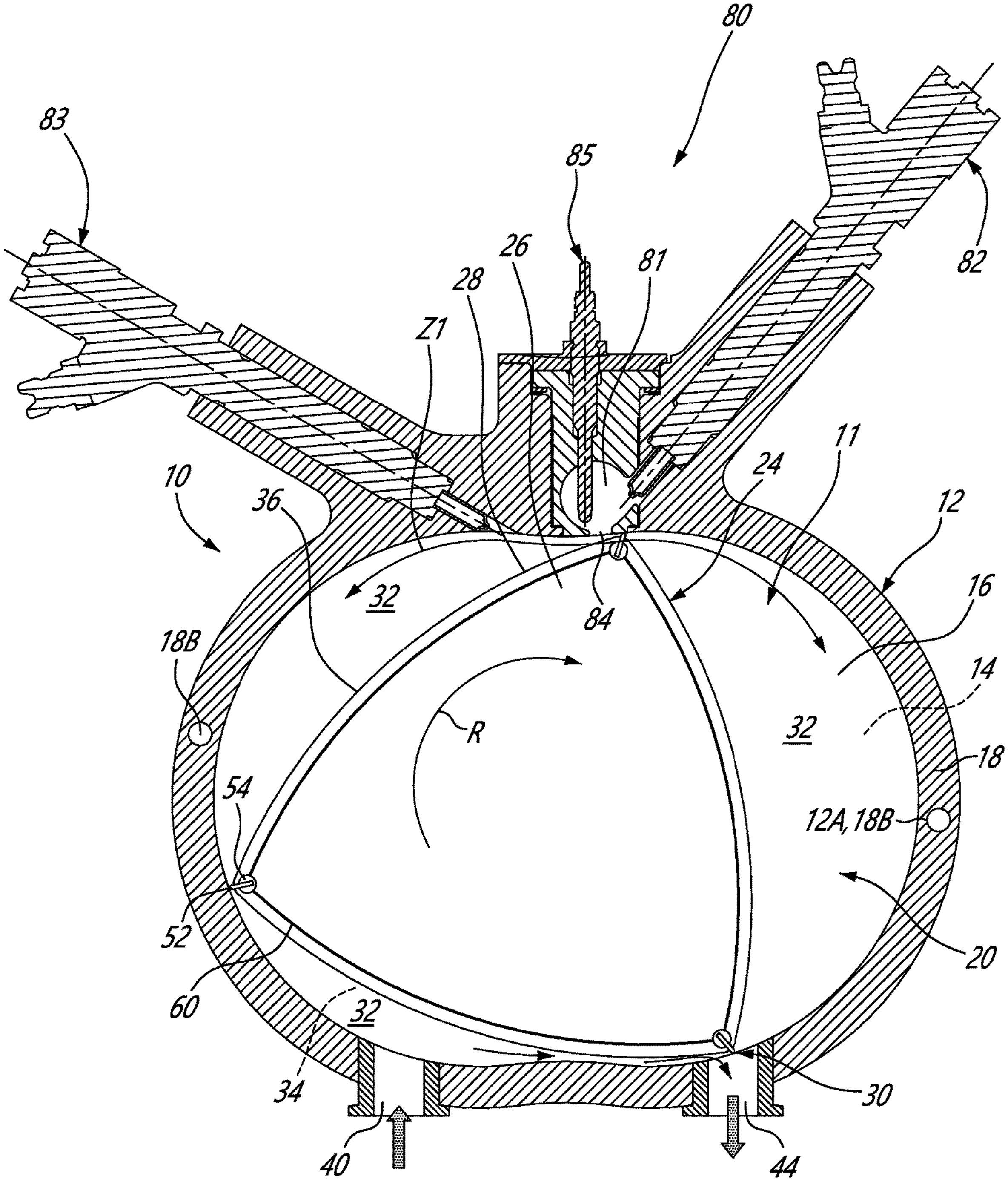
FIG. 1 is a schematic cross-sectional view of a rotary internal combustion engine in accordance with one embodiment.

Referring to FIG. 1, a rotary internal combustion engine, referred to simply as a rotary engine below, which may be a Wankel engine, is schematically shown at 10. The rotary engine 10 comprises an outer body also referred to as a housing assembly 12 having axially-spaced side housings 11, which each includes a side wall 14 and a side plate 16 mounted to the side wall 14, with a rotor housing 18 extending from one of the side housings 11 to the other, to form a rotor cavity 20. The rotor housing 18 has a first side and a second side opposite to the first side. The side housings 11 include a first side housing secured to the first side and a second side housing secured to the second side. The rotor cavity 20 is defined axially between the side housings 11 and circumscribed by the rotor housing 18. In FIG. 1, the side wall 14 is indicated with a dashed line because it sits below the side plate 16. The inner surface of the rotor housing 18 has a profile defining two lobes, which may be an epitrochoid. In some alternate embodiments, the side housings 11 include solely the side wall, that is, the side wall and the side plate may be combined into a single element.

The rotary engine 10 may include one rotor, or more than one rotor. For a one-rotor configuration, the housing assembly 12 includes the two housings 11 and a rotor housing 18 between the two housings 11. The two housings 11 are, in this configuration, two side housings. For a two-rotor configuration, the housing assembly 12 includes the two housings 11 disposed at opposite ends of the engine, and are therefore referred to as side housings, two rotor housings 18, and another housing disposed between the two rotor housings 18 and that defines running surfaces of both of the two rotors. This other housing is referred to as an intermediate housing. The principle of the present disclosures apply to any of the housings 11, whether they are side housings or intermediate housings and the rotor housing(s) 18.

The housing assembly 12 includes a coolant circuit 12A, which may include a plurality of coolant conduits 18B defined within the rotor housing 18. As shown more clearly in FIG. 5, the coolant conduits 18B extends from one of the side housings 11 to the other. The coolant circuit 12A is used for circulating a coolant, such as water or any suitable coolant, to cool the housing assembly 12 during operation of the rotary engine 10. Although only two coolant conduits 18B are shown, it is understood that more than two coolant conduits 18B may be used without departing from the scope of the present disclosure.

An inner body or rotor 24 is received within the rotor cavity 20. The rotor 24 has axially spaced end faces 26 adjacent to the side walls 14, and a peripheral face 28 extending there between. The peripheral face 28 defines three circumferentially-spaced apex portions 30, and a generally triangular profile with outwardly arched sides 36. The apex portions 30 are in sealing engagement with the inner surface of rotor housing 18 to form three rotating combustion chambers 32 between the rotor 24 and housing assembly 12. The combustion chambers 32 vary in volume with rotation of the rotor 24 within the housing assembly 12. The geometrical axis of the rotor 24 is offset from and parallel to the axis of the housing assembly 12. In some embodiments, more or less than three rotating combustion chambers may be provided with other shapes of the rotor.

The combustion chambers 32 are sealed. In the embodiment shown, each rotor apex portion 30 has an apex seal 52 extending from one end face 26 to the other and biased radially outwardly against the rotor housing 18. An end seal 54 engages each end of each apex seal 52 and is biased against the respective side wall 14. Each end face 26 of the rotor 24 has at least one arc-shaped face seal 60 running from each apex portion 30 to each adjacent apex portion 30, adjacent to but inwardly of the rotor periphery throughout its length, in sealing engagement with the end seal 54 adjacent each end thereof and biased into sealing engagement with the adjacent side plates 16 of the side housings 11. Alternate sealing arrangements are also possible.

Although not shown in the Figures, the rotor 24 is journaled on an eccentric portion of a shaft such that the shaft rotates the rotor 24 to perform orbital revolutions within the rotor cavity 20. The shaft may rotate three times for each complete rotation of the rotor 24 as it moves around the rotor cavity 20. Oil seals are provided around the eccentric to impede leakage flow of lubricating oil radially outwardly thereof between the respective rotor end face 26 and side housings 11. During each rotation of the rotor 24, each chamber 32 varies in volumes and moves around the rotor cavity 20 to undergo the four phases of intake, compression, expansion and exhaust, these phases being similar to the strokes in a reciprocating-type internal combustion engine having a four-stroke cycle.

The engine includes a primary inlet port 40 in communication with a source of air and an exhaust port 44 In the embodiment shown, the ports 40, 44 are defined in the rotor housing 18. Alternate configurations are possible.

In a particular embodiment, fuel such as kerosene (jet fuel) or other suitable fuel is delivered into the chamber 32 through a fuel port (not shown) such that the chamber 32 is stratified with a rich fuel-air mixture near the ignition source and a leaner mixture elsewhere, and the fuel-air mixture may be ignited within the housing using any suitable ignition system known in the art (e.g. spark plug, glow plug). In a particular embodiment, the rotary engine 10 operates under the principle of the Miller or Atkinson cycle, with its compression ratio lower than its expansion ratio, through appropriate relative location of the primary inlet port 40 and exhaust port 44.

As shown in FIG. 1, the engine 10 has an injection system 80 for injecting and igniting a fuel. The injection system 80 includes a pilot subchamber 81 defined by the rotor housing 18, a pilot injector 82 having its tip fluidly connected to the pilot subchamber 81, and a main injector 83 fluidly connected to the combustion chambers 32 independently of the pilot subchamber 81. The pilot subchamber 81 communicates with the combustion chambers 32 via an opening 84, which may define a constriction. An igniter 85 is operatively connected to the pilot subchamber 81 and operable to ignite a pilot quantity of fuel injected in the pilot subchamber 81 via the pilot injector 82. A portion of the circumference of the rotor housing 18 in which the injection system 80 is present may be referred to as a combustion region Z1 of the rotary engine 10 since it is in this area that a mixture of air and fuel is injected in the combustion chambers 32 and ignited. This area of the rotor housing 18 may be the hottest.

Referring now to FIGS. 2-5, one of two side housings 11 of the housing assembly 12 is illustrated. As briefly introduced above, the side housings 11 include the side walls 14 that are secured to the rotor housing 18. Each of the side walls 14 has a portion located proximate an outer perimeter P (FIG. 4) of the side wall 14 and configured to be in abutment against the rotor housing 18 for defining the rotor cavity 20.

In the embodiment shown, each of the side walls 14 is configured to be secured to a respective one of opposed ends of the rotor housing 18. The side housings 11 further include side plates 16 located on inner sides of the side walls 14. The side plates 16 define rotor-engaging faces 16A on which the side seals 60 and the corner seals 54 of the rotor 24 are in abutment during rotation of the rotor 24. The side plates 16 further define back faces opposite the rotor-engaging faces 16A. The back faces of the side plates 16 face the side walls 14.

The side walls 14 may be made of aluminum, more specifically an aluminum alloy, due to its light weight and high thermal conductivity. However, it may be required that the surfaces of the side walls 14 in contact with the seals 54, 60 be coated to provide a wear-resistance surface. In the embodiment shown, the side plates 16 are made of aluminum and coated with a hard material such as silicon carbide, aluminum nitride, chromium carbide, tungsten carbide, and so on. Any suitable wear resistant coating applied by thermal spray or any other suitable method may be used. The side walls 14 and the side plates 16 will be described in more details below. Although the text below uses the singular form, the description may be applied to both of the side walls 14 and to both of the side plates 16. The side plates 16 may however be entirely made of the hard material, such as silicon carbide. The side plates 16 may be made of aluminum, steal, or any suitable ceramic.

Figure 4:
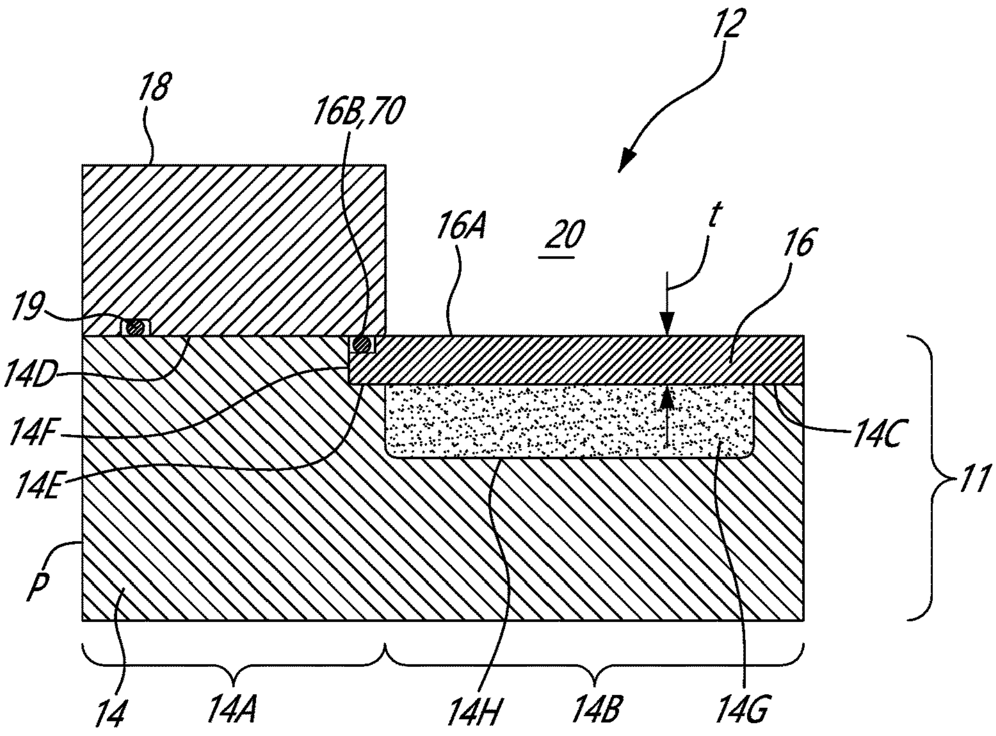
FIG. 4 is a schematic cross-sectional view taken along line B-B of FIG. 2 in accordance with one embodiment.

Referring more particularly to FIG. 4, the side wall 14 includes a peripheral section 14A, which is in abutment with the rotor housing 18, and a center section 14B, which is circumferentially surrounded by the peripheral section 14A. In the disclosed embodiment, the peripheral section 14A of the side wall 14 is secured to the rotor housing 18. The center section 14B of one of the side walls 14 faces the center section 14B of the other of the side walls 14. The side walls 14 are secured to the rotor housing 18 with any suitable means known in the art. As shown, a sealing member 19 is located between the rotor housing 18 and the peripheral sections 14A of the side walls 14 for limiting coolant and combustion gases from leaking out. The sealing member 19 may be an O-ring. The sealing member 19 may be received within an annular recess, which may be defined by one or more of the rotor housing 18 and the side wall 14.

The side wall 14 defines a recess 14C for receiving the side plate 16. The peripheral section 14A of the side wall 14 extends from the outer perimeter P to the recess 14C. As shown, a surface 14D of the peripheral section 14A of the side wall 14 that faces the rotor housing 18 is axially offset from a surface 14E of the center section 14B of the side wall 14. A magnitude of the offset corresponds to a depth of the recess 14C and may correspond to a thickness t of the side plate 16 plus any axial gap defined between a rotor-engaging face of the side plate 16 and the rotor housing 18. The side plate 16 is therefore in abutment with the surface 14E of the center section 14B of the side wall 14. In other words, a sealing surface of the side plate 16, located on a side of the side plate 16 that faces the rotor cavity, may be aligned with the peripheral section 14A of the side wall 14.

The side wall 14 defines an abutment surface 14F. The abutment surface 14F is defined by a shoulder created by the offset of the surfaces 14D, 14E of the peripheral and central sections 14A, 14B of the side wall 14. The side wall 14, via its abutment surface 14F, limits radial movements of the side plate 16 relative to the axis of rotation of the rotor 24. The side plate 16 may be supported by a housing in the center to limit the movement of the side plate 16.

In a particular embodiment, a gap may remain between a peripheral section of the side plate 16 and the abutment surface 14F of the side wall 14. In other words, and in the embodiment shown, the side plate 16 may be spaced apart from the abutment surface 14F. A size of the gap may change during operation of the rotary engine 10 as the side wall 14 and the side plate 16 may expand at different rates with an increase of a temperature in the rotor cavity 20. In other words, the space between the side plate 16 and the abutment surface 14F of the side wall 14 may allow relative thermal expansion between the side plate 16 and the side wall 14 so that thermal stress transferred from the side plate 16 to the rotor housing 18 and the side wall 14 might be minimized.

To limit axial movements of the side plate 16 relative to the axis of rotation of the rotor 24 (FIG. 1), a periphery of the side plate 16 is contained axially between the rotor housing 18 and the side wall 14. In other words, the periphery of the side plate 16 is sandwiched between the side wall 14 and the rotor housing 18. A seal 70 is located at the periphery of the side plate 16 for limiting the combustion gases to leak out of the rotor cavity 20 and for limiting the cooling fluid from leaking into the combustion chamber 32 (FIG. 1). As shown more specifically in FIGS. 4-5, the seal 70 is contained within a groove 16B defined by the side plate 16. The seal 70 is described in detail below.

In a particular embodiment, the seal 70 and the abutment surface 14F of the side wall 14 allows the side plate 16 to move radially relative to the side wall 14. Such a movement, along a radial direction relative to the axis of rotation of the rotor 24, may be required in a configuration in which the side wall 14 is made of a material having a coefficient of thermal expansion different than that of the side plate 16 and/or because the different components may be exposed to different temperatures and, thus may exhibit different thermal expansion.

The side wall 14 further defines a pocket 14G that may circumferentially extend a full circumference of the side wall 14. In other words, the pocket 14G is annular. More than one pocket may be used. The pocket 14G may not cover an entirety of the center section 14B of the side wall 14. The pocket 14G is configured for circulating a liquid coolant, such as water for cooling the side plate 16. The pocket 14G may be part of the coolant circuit 12A and is in fluid flow communication with the coolant conduits 18B that are defined in the rotor housing 18. The pocket 14G extends from the surface 14E of the center section 14B and away from the rotor cavity 20. A depth D (FIG. 5) of the pocket 14G is defined by a distance along the axis of rotation of the rotor 24 between the surface 14E of the center section 14B and a bottom surface 14H of the pocket 14G.

Figure 2:
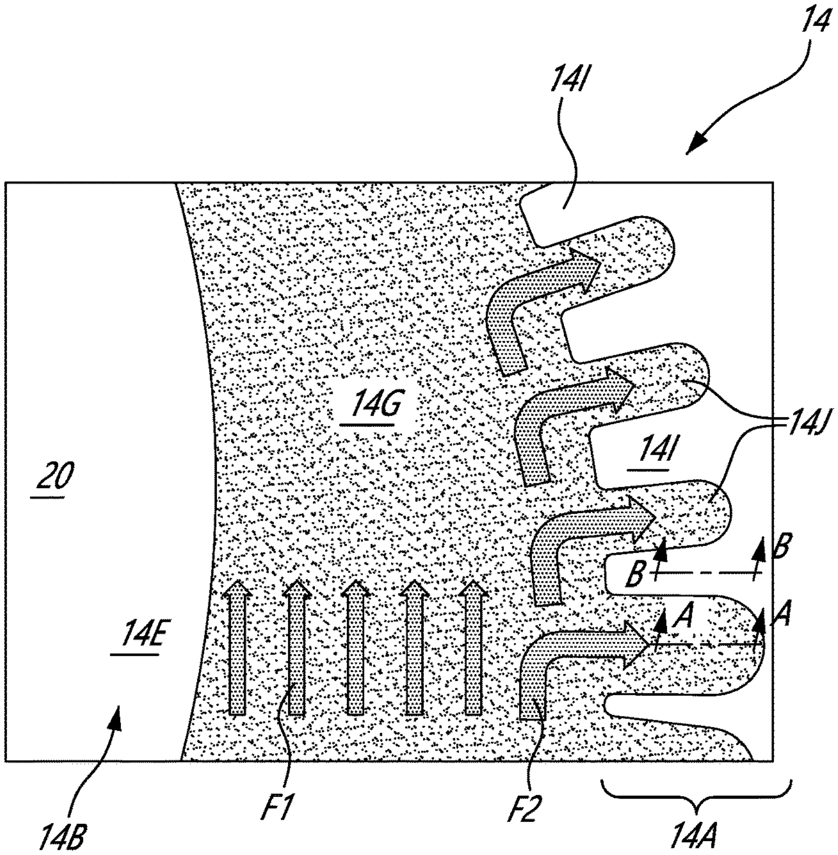
FIG. 2 is a schematic fragmented top view of a side wall of a side housing of the rotary internal combustion engine of FIG. 1.
Figure 3:
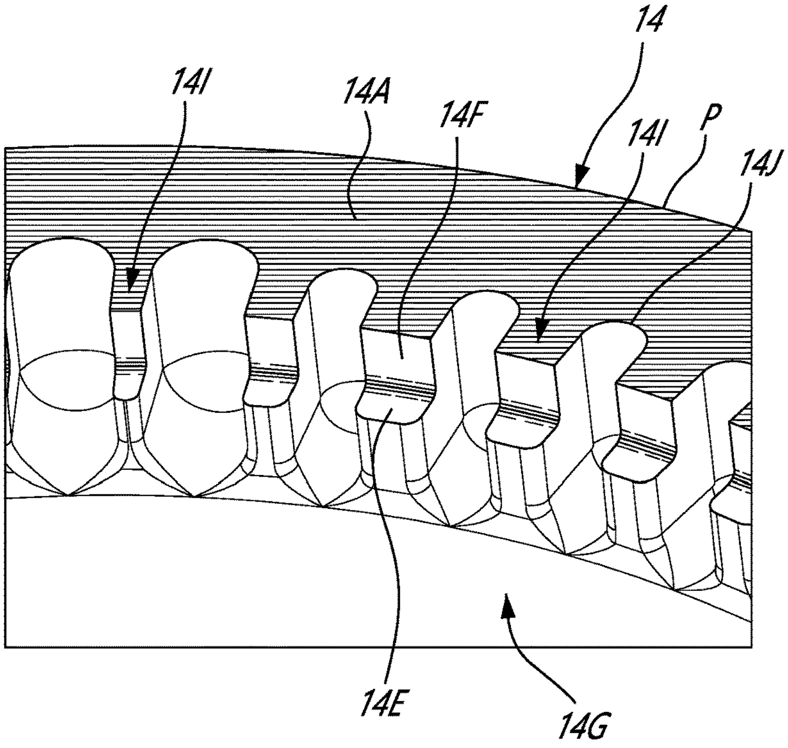
FIG. 3 is a schematic fragmented three-dimensional view of the side wall of FIG. 2.

As shown in FIGS. 2-3, the peripheral section 14A of the side wall 14 defines a plurality of ribs 141 that are circumferentially distributed around the rotor cavity 20. The ribs 141 defines the abutment surface 14F and a portion of the surface 14E of the center section 14B of the side wall 14. Consequently, and in the depicted embodiment, the abutment surface 14F is defined by a plurality of surfaces defined by the ribs 141. The ribs 141 may be configured to support a pressure load imparted by a combustion of a mixture of air and fuel within the combustion chambers 32.

Cavities or spaces 14J are defined between the ribs 141. More specifically, each pair of two consecutive ones of the ribs 141 defines a space 14J therebetween. The spaces 14J are in fluid communication with the pocket 14G and with the coolant conduits 18B of the rotor housing 18. Stated otherwise, the coolant conduits 18B are in fluid communication with the pocket 14G via the spaces 14J between the ribs 141. The spaces 14J may allow the liquid coolant to flow from the pocket 14G to the coolant conduits 18B of the rotor housing 18. It is understood that the liquid coolant may be circulated in closed loop and through a heat exchanger. The heat exchanger may be used to dissipate heat to an environment outside the engine; the heat transferred from the engine to the liquid coolant.

Figure 5:
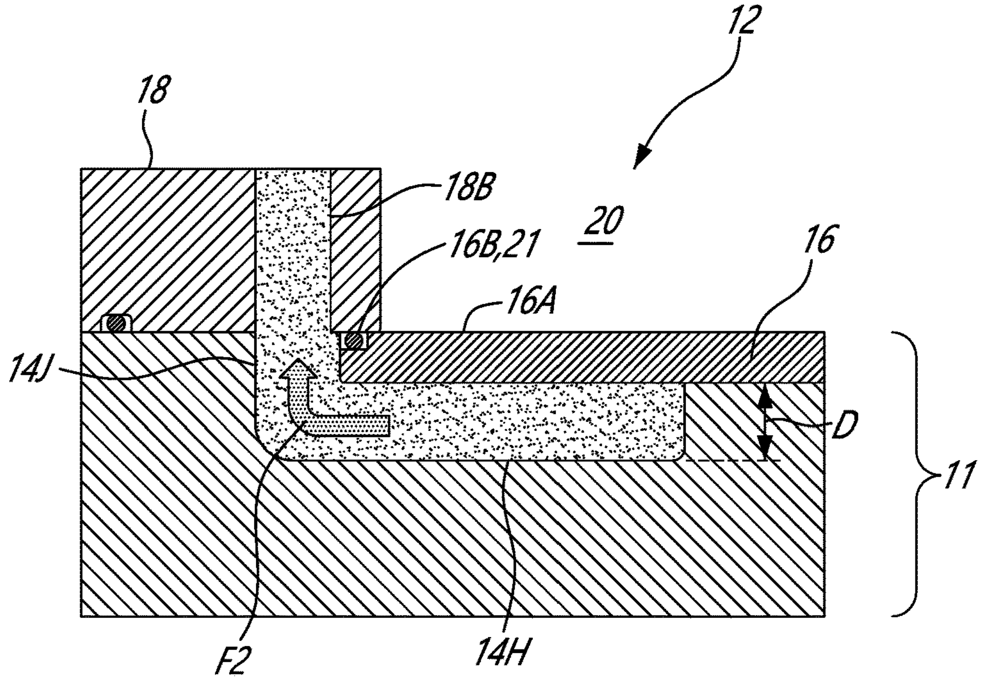
FIG. 5 is a schematic cross-sectional view taken along line A-A of FIG. 2 in accordance with the embodiment of FIG. 4.

As shown in FIGS. 2 and 5, a flow F1 of the liquid coolant circulates within the pocket 14G. The flow F1 is divided in sub-flows F2; each of the sub-flows F2 circulating within a respective one of the spaces 14J and within a respective one of the coolant conduits 18B of the coolant circuit 12A. The liquid coolant may be circulated out of the housing assembly 12 and within a heat exchanger for extracting the heat. The liquid coolant may then be reinjected in the coolant circuit 12A for further heat extraction.

Figure 6:
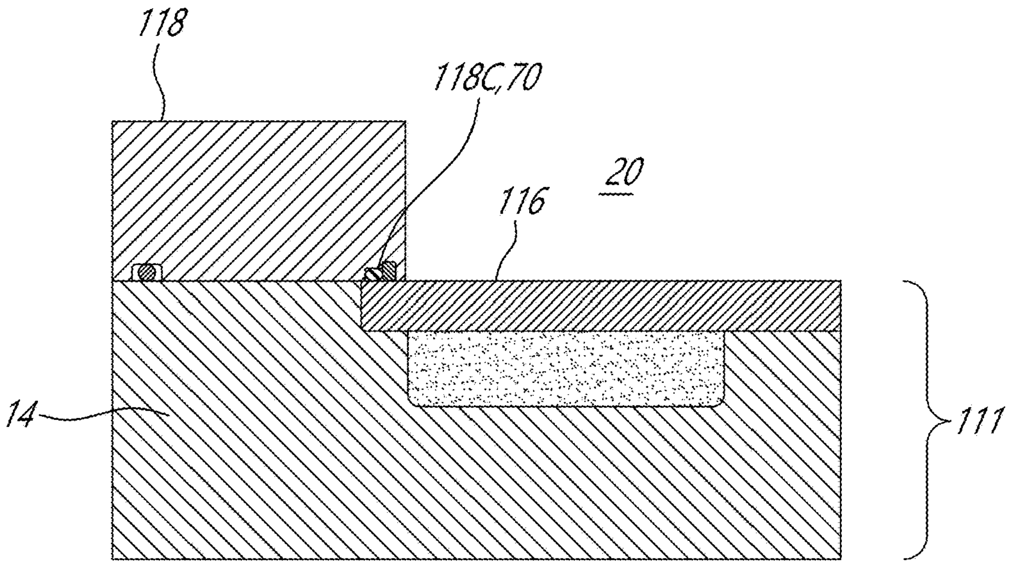
FIG. 6 is a schematic cross-sectional view taken along line B-B of FIG. 2 in accordance with another embodiment.

Referring now to FIG. 6, another embodiment of the outer body, more specifically of the side housing 111 and rotor housing 118, is generally shown. For the sake of conciseness, only elements that differ from the housing assembly 12 of FIGS. 2-5 are described. In the embodiment shown, the rotor housing 118 defines a groove 118C that receives the seal 70.

The description below refers more particularly to the embodiment of FIG. 7 in which the rotor housing 118 defines a groove 118C annularly extending around the axis of the housing assembly 12. It will however be appreciated that the principles of the present disclosure apply equally to the embodiment of FIG. 4 in which the seal 70 is received within a recess or a groove defined by the side plate 116. In some embodiments, the seal 70 maybe received within a groove or recess defined conjointly by both the rotor housing 18 and the side plate 116. The seal 70 may thus be located outwardly of the inner face of the rotor housing 18 and overlaps a peripheral section of the side housing 111. This peripheral section corresponds to the section of the side housing 111 or side plate 116 that is overlapped by the rotor housing 118. Herein, since the side housing 111 includes a side wall 14 secured to the rotor housing 118 and a side plate 116, the peripheral section corresponds to a section of the side plate 116 that is dispose axially between, or sandwiched, between the rotor housing 118 and the side wall 14.

Figure 7:
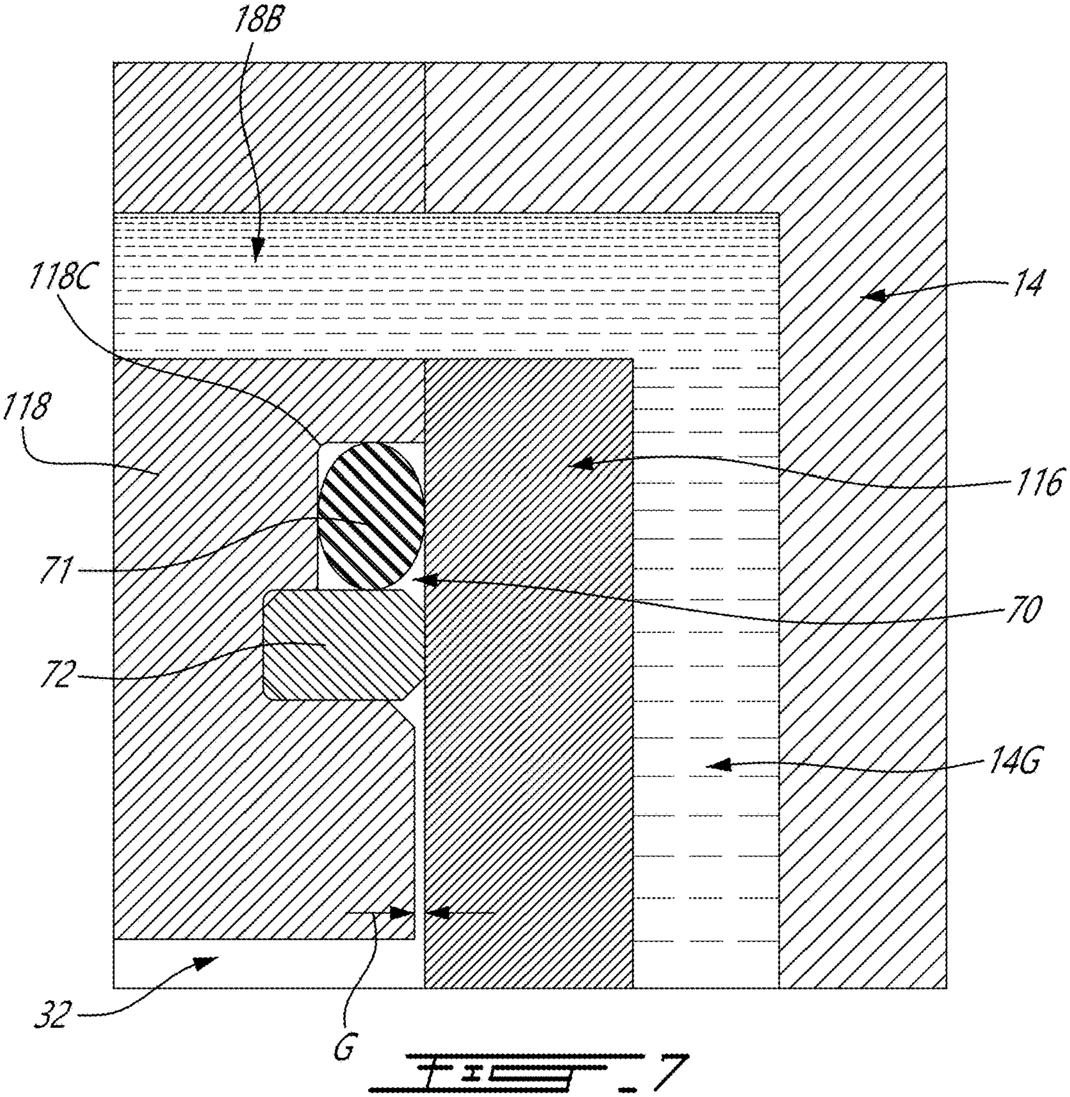
FIG. 7 is an enlarged view of a portion of FIG. 6.

Referring now to FIG. 7, the seal 70 is used to prevent leakage of the combustion gases out of the rotor cavity 20 and to prevent the liquid coolant from leaking out of the coolant circuit 12A. However, there is a gap G defined axially between the side plate 116 and the rotor housing 118. This gap G is present to ensure that the side plate 116 is not within the engine clamping stack and thus to avoid transmitting axial load generated by fastening the rotor housing 118 to the side housings 111. The coolant flowing within the coolant circuit 12A is used to maintain the metal temperatures around the seal 70 within an acceptable level. However, in the embodiment shown, the gap G has a dimension of about 0.004"±0.0007. Other dimensions are contemplated. The gap G is sized to reduce the loading of the side plates 116 due to thermal expansions. As a result, the gap G may remain open at some circumferential locations during operation of the engine. This may allow hot combustion gases to impinge on the seal 70. The seal 70 of the present disclosure may be designed to withstand these harsh operating conditions. The seal 70 may adequately seal the rotor cavity 20 from the coolant circuit 12A and limit axial clamping load on the side plates 116.

In some cases, a metallic seal, such as a E-seal may be used to shield an elastomeric member of the seal 70 from the combustion gases. However, it has been discovered by the inventors of the present disclosure that, with time, carbon may build-up within grooves of such a seal thus impairing its ability to seal over time. More specifically, the E-seal relies on pressure to expand to increase a contact force on opposed surfaces. The carbon build-up may prevent the pressure from penetrating the grooves thereby impeding its ability to expand under pressure.

In the embodiment shown, the seal 70 includes an elastomeric member 71 and a thermoset plastic member 72, which may at least partially alleviate the afore-mentioned drawbacks of the metallic seal. The elastomeric member 71 is compressed between the peripheral section of the side housing 111 and the rotor housing 118. More specifically, the elastomeric member 71 is compressed between the peripheral section of the side plate 116 and the rotor housing 118, herein within the groove 118C. The elastomeric member 71 may be made of any suitable material such as, for instance, Viton™, silicone, perfluoroelastomer, fluorocarbon-based fluoroelastomer, and so on.

The thermoset plastic member 72 axially overlaps the elastomeric member 71 such as to protect the elastomeric member 72 from the combustion gases. The thermoset plastic member 72 may extend axially an entirety or more of an axial dimension of the elastomeric member 71. In some embodiments, the thermoset plastic member 72 may extend axially only to overlap the gap G between the rotor housing 118 and the side plate 116. The thermoset plastic member 72 may be part of a composite member including two or more layers radially offset from one another.

The thermoset plastic member 72 of the disclosed embodiment is made of polybenzimidazole, which is a thermoset plastic material. A thermoset plastic material is a polymer obtained by irreversibly hardening (e.g., curing) a soft solid or viscous liquid prepolymer (e.g., resin). Curing may be induced by heat or radiation and may be promoted by high pressure or mixing with a catalyst. This material is chosen because of its high resistance to temperature and because of its tribologic properties. Put differently, this material is able to provide good contact with the neighbouring surfaces without adhering to them, it may not create pitting on the side plate 116, and so on. Any thermoset plastic material that exhibit similar properties may be used instead of the polybenzimidazole. The thermoset plastic member 72 may include a polybenzimidazole-based material. Put differently, the thermoset plastic member 72 may be a mixture of polybenzimidazole and another material.

In the disclosed embodiment, the groove 118C has two sections of different depth taken in a direction normal to the side plate 116. A first section of the groove 118C having the smallest depth receives the elastomeric member 17 while a second section of the groove 118C, disposed inwardly of the first section, and having the largest depth, receives the thermoset plastic member 72. The two sections communicate with one another. That is, the groove 118C is a single groove defining two different depths. The groove of different depths may not be required in all embodiments.

The thermoset plastic member 72 is disposed inwardly of the elastomeric member 71 relative to the axis of rotation of the rotor 24 (FIG. 1). The thermoset plastic member 72 is therefore located radially between the inner face of the rotor housing 118 and the elastomeric member 71; the inner face of the rotor housing 118 being in sealing contact with the rotor 24. The thermoset plastic member 72 is in contact with both of the peripheral section of the side housing 111 and the rotor housing 118, herein in contact with both of the rotor housing 118 within the groove 118C and with the side plate 116. The elastomeric member 71 and thermoset plastic member 72 contact both of the rotor housing 118 and the side plate 116 and may be compressed therebetween. The thermoset plastic member 72 is made of a material having a melting point above a temperature of combustion gases inside the rotor cavity 20. Thus, the thermoset plastic member 72 may be able to protect the elastomeric member 71 from impingement with hot combustion gases exiting the rotor cavity 20 via the gap G.

Figure 8:
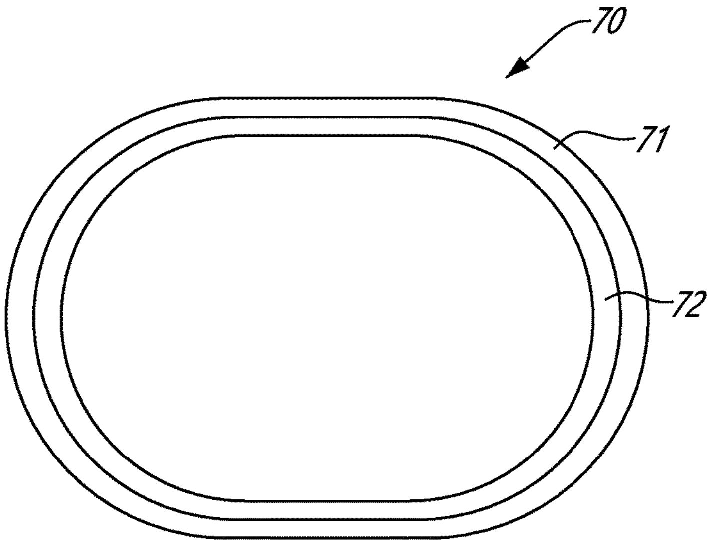
FIG. 8 is a top view of a seal for the side housing of FIG. 7.

Referring to FIG. 8, the elastomeric member 71 and the thermoset plastic member 72 may have a substantially round shape when not received in the groove 118C of the rotor housing 118. However, this groove 118C typically extends annularly all around the rotor cavity 20 and may have a shape matching that of the housing assembly 12. The groove 118C extends around a perimeter of the side housing 11. Thus, the elastomeric member 71 and the thermoset plastic member 72 may have an epitrochoid, ellipsoid, or oval shape when inserted into the groove 118C. As illustrated, the elastomeric member 71 is disposed radially outwardly of the thermoset plastic member 72. The thermoset plastic member 72 axially overlaps an entirety of the elastomeric member 71 to avoid leaving exposed a portion of the elastomeric member 71. The elastomeric member 71 and the thermoset plastic member 72 axially overlap one another relative to a central axis thereof. Both of the elastomeric member 71 and the thermoset plastic member 72 may be continuous along a full perimeter. However, in some embodiments, the thermoset plastic member 72 may include a plurality of shield segments circumferentially distributed and secured to one another.

As aforementioned, the axial force exerted by the thermoset plastic member 72 is preferably high enough to seal, but not too high in order to still permit movements of the side plate 116 due to thermal growth. The thermoset plastic member 72 of the present disclosure may satisfy these requirements.

Figure 9:
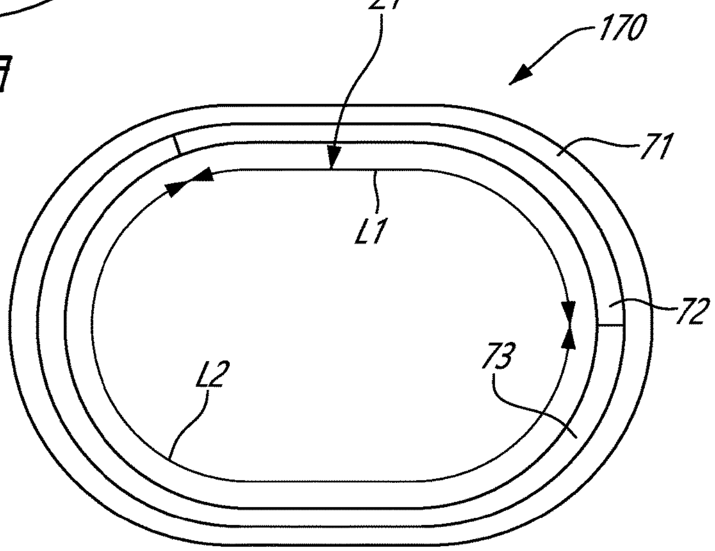
FIG. 9 is a top view of a seal in accordance with another embodiment for the side housing of FIG. 7.

Referring to FIG. 9, another embodiment of the seal is shown at 170. The seal 170 includes the elastomeric member 71 and the thermoset plastic member 72. However, the thermoset plastic member 72 only defines a first circumferential segment of the shield 170. Hence, the thermoset plastic member 72 extends at least a portion of the perimeter of the groove. The shield 170 includes a second circumferential segment extending along a remainder of the perimeter of the groove not filled with the thermoset plastic member 72. Hence, the thermoset plastic member 72 extends along a first length L1 that is less than a full circumference of the rotor housing 118. A remainder of the circumference is defined by a second member 73 that extends a second length L2 that covers a remainder of the circumference of the rotor housing 118 not covered by the thermoset plastic member 72. The second member 73 may be made of another material such as polyether ether ketone (PEEK™), or any other suitable material. A junction between these two materials may be defined by an overlapping joint, a tongue and groove, and so on. The second member 73 may be an E-seal. The first length L1 of the thermoset plastic member 72 covers the combustion region Z1 of the rotary engine 10, which is in register with where the pilot and main injectors are located (see FIG. 1). Thus, at critical regions of the rotary engine 10, that is, where combustion occurs and where pressure and temperature are maximal, the thermoset plastic member 72, such as polybenzimidazole, is used. At other locations offset from the combustion region, where pressure and temperature are less critical, another material (e.g., polyether ether ketone, metallic seal, etc) may be used. This may save costs.

Figure 10:
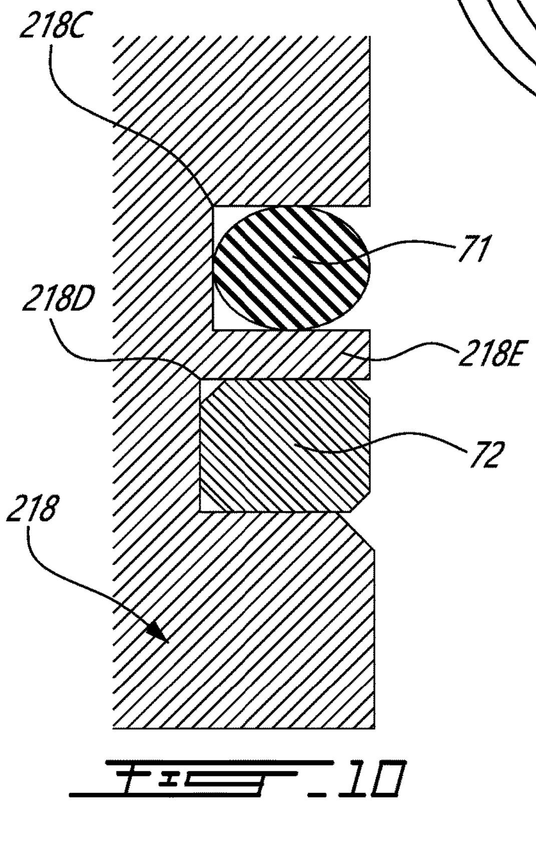
FIG. 10 is an alternate embodiment of a side housing.

Referring now to FIG. 10, another embodiment of the rotor housing is shown at 218. In this embodiment, the rotor housing 218 defines two grooves, namely an outer groove 218C and an inner groove 218D separated from one another by an annular wall 218E extending a full circumference of the rotor housing 18. The outer groove 218C receives the elastomeric member 71 while the inner groove 218D receives the thermoset plastic member 72. The annular wall 218E may further help in shielding the elastomeric member 71 from the combustion gases. In some embodiments, the annular wall 218E separating the two grooves may be used as support to the thermoset plastic member 72 to react pressure exerted by the combustion gases. The annular wall 218E may extend axially up to a distal end, which may be spaced apart from the side plate 116 by the gap G. A side of the thermoset plastic member 72 may be fully in contact against the annular wall 218E.

Figure 11:
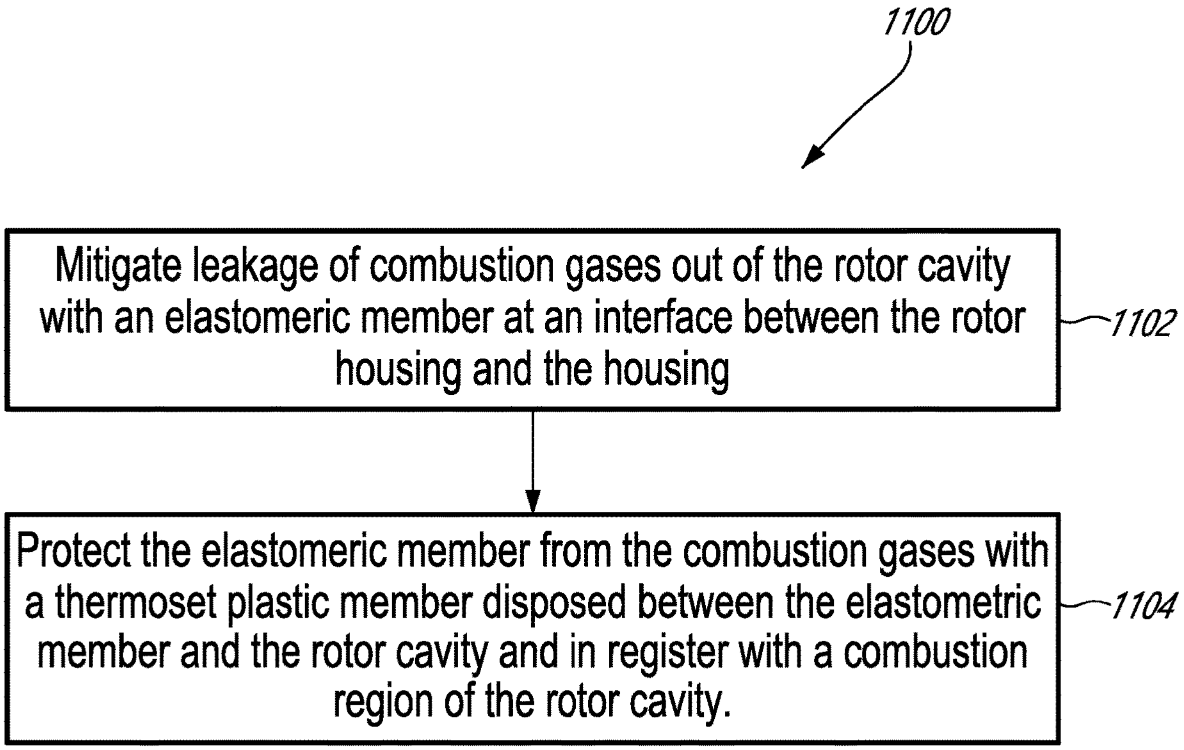
FIG. 11 is a flowchart illustrating steps of sealing a rotary internal combustion engine.

Referring now to FIG. 11, a method of sealing the rotary engine 10 is shown at 1100. The method 1100 includes mitigating leakage of combustion gases out of the rotor cavity 20 with the elastomeric member 71 at an interface between the rotor housing 18 and the side housings 11 at 1102; and protecting the elastomeric member 71 from the combustion gases with the thermoset plastic member 72 disposed between the elastomeric member 71 and the rotor cavity 20 and in register with the combustion region Z1 (FIG. 1) of the rotor cavity 20 at 1104. As shown in FIG. 1, the thermoset plastic member 72 circumferentially overlaps the pilot subchamber. Put differently, the thermoset plastic member 72 circumferentially overlaps the region of the housing 12 where the pilot subchamber is located.

In the depicted embodiment, the protecting of the elastomeric member 71 at 1102 includes protecting the elastomeric member with the thermoset plastic member made 72 of polybenzimidazole.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A housing assembly for a rotary internal combustion engine, comprising:

a rotor housing defining a rotor cavity extending around a rotation axis, the rotor housing extending from a first side to a second side, the rotor housing having an inner face facing the rotor cavity;

a housing secured to the first side of the rotor housing and thereby enclosing the rotor cavity, the housing including a side wall secured to the rotor housing and a side plate, a peripheral section of the side plate disposed between the side wall and the rotor housing; and a seal received within a groove defined by one or both of the rotor housing and the housing at an interface between the rotor housing and the housing, the groove extending around a perimeter of the first side of the rotor housing, the groove being located radially outwardly of the inner face of the rotor housing, a gap being defined between the rotor housing and the peripheral section of the side plate, the groove communicating with the rotor cavity through the gap, the seal including:

an elastomeric member; and a shield disposed radially inwardly of the elastomeric member relative to the rotation axis and in contact with both the housing and the rotor housing, the shield including a thermoset plastic member extending along at least a portion of a perimeter of the groove and axially overlapping the elastomeric member relative to the rotation axis, the thermoset plastic member circumferentially, relative to the rotation axis, overlapping a combustion region of the rotor cavity where combustion occurs during operation of the rotary internal combustion engine.

2. The housing assembly of claim 1, wherein the thermoset plastic member is made of polybenzimidazole.

3. The housing assembly of claim 1, wherein the thermoset plastic member extends an entirety of the perimeter of the groove.

4. The housing assembly of claim 1, wherein the shield is circumferentially segmented and includes a first circumferential segment including the thermoset plastic member and a second circumferential segment made of polyether ether ketone, the second circumferential segment extending along a remainder of the perimeter of the groove.

5. The housing assembly of claim 1, wherein the shield is circumferentially segmented and includes a first circumferential segment including the thermoset plastic member and a second circumferential segment made of a metallic seal, the second circumferential segment extending along a remainder of the perimeter of the groove.

6. The housing assembly of claim 1, wherein the groove includes an inner groove and an outer groove separated from one another by an annular wall, the elastomeric member received in the outer groove, the shield received in the inner groove.

7. The housing assembly of claim 1, comprising a coolant circuit within the rotor housing and the housing, the seal fluidly separating the coolant circuit from the rotor cavity.

8. A rotary internal combustion engine comprising:

a rotor;

a rotor housing defining a rotor cavity extending around a rotation axis, the rotor housing extending from a first side to a second side, the rotor housing having an inner face facing the rotor cavity;

a housing secured to the first side of the rotor housing, the housing defining a pilot subchamber; and a seal received within a groove defined by one or both of the rotor housing and the housing at an interface between the rotor housing and the housing, the groove extending around a perimeter of the first side of the rotor housing, the groove being located radially outwardly of the inner face of the rotor housing, the seal including:

an elastomeric member; and a shield disposed radially inwardly of the elastomeric member relative to the rotation axis and in contact with both of the housing and the rotor housing, the shield including a circumferential segment made of a thermoset plastic member axially overlapping the elastomeric member relative to the rotation axis, the circumferential segment circumferentially overlapping, relative to the rotation axis, a region of the rotor cavity where combustion occurs during operation of the rotary internal combustion engine, the circumferential segment circumferentially overlapping the pilot subchamber.

9. The rotary internal combustion engine of claim 8, wherein the thermoset plastic member is made of polybenzimidazole.

10. The rotary internal combustion engine of claim 8, wherein the shield is circumferentially segmented and includes the circumferential segment including the thermoset plastic member and a second circumferential segment made of polyether ether ketone, the second circumferential segment extending along a remainder of a circumference of the groove.

11. The rotary internal combustion engine of claim 8, wherein the shield is circumferentially segmented and includes the circumferential segment including the thermoset plastic member and a second circumferential segment made of a metallic seal, the second circumferential segment extending along a remainder of a circumference of the groove.

12. The rotary internal combustion engine of claim 8, wherein the groove includes an inner groove and an outer groove separated from one another by an annular wall, the elastomeric member received in the outer groove, the shield received in the inner groove.

13. The rotary internal combustion engine of claim 8, wherein the housing includes a side wall secured to the rotor housing and a side plate, a peripheral section of the side plate disposed between the side wall and the rotor housing.

14. The rotary internal combustion engine of claim 13, wherein a gap is defined between the rotor housing and the peripheral section of the side plate, the groove communicating with the rotor cavity through the gap.

15. The rotary internal combustion engine of claim 8, comprising a coolant circuit within the rotor housing and the housing, the seal fluidly separating the coolant circuit from the rotor cavity.

16. A method of sealing a rotary internal combustion engine having a rotor cavity bounded by a rotor housing and a housing, the method comprising:

mitigating leakage of combustion gases out of the rotor cavity with an elastomeric member at an interface between the rotor housing and the housing, wherein a gap is located between the rotor housing and the housing; and protecting the elastomeric member from the combustion gases with a thermoset plastic member disposed between the elastomeric member and the rotor cavity and in register with a combustion region of the rotor cavity, the thermoset plastic member exposed to the combustion gases via the gap.

17. The method of claim 16, wherein the protecting of the elastomeric member from the combustion gases with the thermoset plastic member includes protecting the elastomeric member with the thermoset plastic member made of polybenzimidazole.

* * * * *